United States Patent
Wung et al.

(10) Patent No.: US 10,527,043 B2
(45) Date of Patent: Jan. 7, 2020

(54) MOTOR, CONTROLLER AND ASSOCIATED METHOD

(71) Applicant: Regal Beloit America, Inc., Beloit, WI (US)

(72) Inventors: Peter Yu-Pu Wung, Troy, OH (US); Stephen Douglas O'Brien, Troy, OH (US); Howard Ray Richardson, Troy, OH (US)

(73) Assignee: Regal Beloit America, Inc., Beloit, WI (US)

( * ) Notice: Subject to any disclaimer, the term of this patent is extended or adjusted under 35 U.S.C. 154(b) by 388 days.

(21) Appl. No.: 14/671,500

(22) Filed: Mar. 27, 2015

(65) Prior Publication Data

US 2016/0281719 A1    Sep. 29, 2016

(51) Int. Cl.
*F04D 15/00* (2006.01)
(52) U.S. Cl.
CPC .............. *F04D 15/0088* (2013.01)
(58) Field of Classification Search
CPC ...... F04B 49/06; F04D 15/0088; H02K 11/33
USPC ............................. 417/44.11, 44.1
See application file for complete search history.

(56) References Cited

U.S. PATENT DOCUMENTS

| | | | |
|---|---|---|---|
| 3,033,969 A * | 5/1962 | Benway | H02J 3/14 219/493 |
| 3,548,815 A * | 12/1970 | Everston | A61H 33/0087 601/157 |
| 4,368,549 A * | 1/1983 | Ramey | E04H 4/129 126/562 |
| 4,398,562 A * | 8/1983 | Saarem | F16K 31/041 126/585 |
| 5,014,770 A * | 5/1991 | Palmer | F24D 3/005 126/563 |
| 6,375,090 B1 | 4/2002 | Beidokhti | |
| 6,857,967 B2 | 2/2005 | Loyd et al. | |
| 7,484,938 B2 | 2/2009 | Allen | |
| 7,612,510 B2 | 11/2009 | Koehl | |
| 7,690,897 B2 | 4/2010 | Branecky et al. | |
| 7,777,435 B2 | 8/2010 | Aguilar et al. | |
| 7,854,597 B2 * | 12/2010 | Stiles, Jr. | F04B 49/20 210/167.1 |
| 7,988,425 B1 | 8/2011 | Stingl | |
| 8,104,110 B2 * | 1/2012 | Caudill | A61H 33/005 4/541.1 |
| 8,177,519 B2 | 5/2012 | Branecky | |
| 8,177,520 B2 | 5/2012 | Mehlhorn et al. | |

(Continued)

OTHER PUBLICATIONS

Twin City Fans & Blowers. Electronically Commutated Motors Installation, Operation & Maintenance Manual IM-4055. Minneapolis, MN: Twin City Fans & Blowers, Apr. 2012. Print.*

(Continued)

*Primary Examiner* — Patrick Hamo
*Assistant Examiner* — Joseph S. Herrmann
(74) *Attorney, Agent, or Firm* — Regal Beloit America, Inc.; John S. Wagley

(57) ABSTRACT

According to an embodiment of the invention, a pump motor controller for managing energy usage of a pump motor and for receiving signals from a signal sending device corresponding to the status of a climate control device is provided. The motor controller is adapted to receive the signal and to control the pump motor at least partially based on the signal.

17 Claims, 9 Drawing Sheets

(56) References Cited

U.S. PATENT DOCUMENTS

| | | | |
|---|---|---|---|
| 8,354,809 B2 | 1/2013 | Mehlhorn et al. | |
| 8,480,374 B2 | 7/2013 | Yang | |
| 8,489,242 B2 | 7/2013 | Valluri et al. | |
| 8,602,743 B2 | 12/2013 | Stiles, Jr. et al. | |
| 8,820,355 B2 * | 9/2014 | Sutton | F16K 31/52483 137/119.07 |
| 9,051,930 B2 | 6/2015 | Stiles, Jr. et al. | |
| 2003/0015477 A1 | 1/2003 | Hornsby | |
| 2009/0038696 A1 | 2/2009 | Levin et al. | |
| 2009/0151801 A1 | 6/2009 | Gorman et al. | |
| 2011/0110794 A1 | 5/2011 | Mayleben et al. | |
| 2012/0029705 A1 | 2/2012 | Broniak et al. | |
| 2012/0073040 A1 | 3/2012 | Cohen | |
| 2012/0219428 A1 | 8/2012 | Cantolino et al. | |
| 2012/0296489 A1 * | 11/2012 | Lee | H02J 3/008 700/297 |
| 2013/0104306 A1 | 5/2013 | McKinzie | |
| 2013/0216398 A1 | 8/2013 | Stephens | |
| 2013/0269729 A1 | 10/2013 | Erlich et al. | |
| 2014/0250580 A1 | 9/2014 | Magyar | |
| 2014/0271235 A1 | 9/2014 | Magyar | |
| 2014/0277774 A1 | 9/2014 | McKinzie | |
| 2014/0277775 A1 | 9/2014 | McKinzie | |
| 2014/0314062 A1 | 10/2014 | Loebs | |
| 2015/0132148 A1 | 5/2015 | Afshar | |

OTHER PUBLICATIONS

Thoubboron, Kerry. "What's the Cheapest Time of Day to Use Electricity with Time-of-Use Rates?" Solar News, EnergySage, Aug. 2, 2018, news.energysage.com/whats-the-cheapest-time-of-day-to-use-electricity-with-time-of-use-rates/. (Year: 2018).*

* cited by examiner

MOTOR, CONTROLLER AND ASSOCIATED METHOD

BACKGROUND OF THE INVENTION

The embodiments described herein relate generally to fluid moving devices and controller, and more specifically, to a pump motor and controller.

Pumps for pools and spas are used to circulate water within the pools and spas to maintain a pleasant condition for the water in the pool. Pumps and pump motors are designed to be able to circulate the water sufficiently while operating for only a portion of the time.

Energy consumption tends to vary during different days of the week and different times of the day. Energy provided by the energy providers must be capable of meeting the demands of the times of highest energy consumption. Due to the enormous capital expenses required to provide electrical power to residential consumers, energy providers have devised methodologies to discourage energy use at those times of highest energy consumption.

Pool and spa pump motors are one device type for which energy consumption can be scheduled for use at times of lower energy consumption. Scheduling such consumption can be difficult or inconvenient, particularly where the methodologies are complex.

The present invention is directed to alleviate at least some of these problems with the prior art.

BRIEF DESCRIPTION OF THE INVENTION

According to an embodiment of the invention, a pump motor controller for managing energy usage of a pump motor and for receiving signals from a signal sending device corresponding to the status of a climate control device is provided. The pump motor controller is adapted to receive the signal and to control the pump motor at least partially based on the signal.

According to an aspect of the present invention, the pump motor controller may be provided wherein the signal sending device is a thermostat.

According to another aspect of the present invention, the pump motor controller may be provided wherein the motor includes an electronically commutated motor.

According to yet another aspect of the present invention, the pump motor controller may be provided wherein the climate control device is a furnace.

According to yet another aspect of the present invention, the pump motor controller may be provided wherein the pump motor controller is adapted to control a device for servicing one of a pool and a spa.

According to yet another aspect of the present invention, the pump motor controller may be provided wherein the pump motor controller is adapted to receive a second signal and to control the pump motor at least partially based on the second signal.

According to yet another aspect of the present invention, the pump motor controller may be provided wherein the controller is adapted to control the pump motor to optimize electrical consumption of the pump motor and electrical consumption of the climate control device According to yet another aspect of the present invention, the pump motor controller may further include a timer or a clock. The timer or the clock is adapted to coordinate with the controller to control the pump motor to optimize electrical consumption costs.

According to another embodiment of the present invention, a motor for managing energy usage in at least one of a pool and a spa based at least partially on the energy usage of a climate control system is provided. The motor is adapted for powering a pump for use in a pool or a spa. The motor includes a motor controller for controlling the motor. The controller is adapted to receive a signal associated with the climate control system. The signal corresponds to the status of the climate control system. The controller is adapted to control the pump motor at least partially based on the signal.

According to another aspect of the present invention, the motor may be provided wherein the controller is adapted to receive the signal from a thermostat.

According to yet another aspect of the present invention, the motor may be provided wherein the motor includes an electronically commutated motor.

According to yet another aspect of the present invention, the motor may be provided wherein the climate control device is a furnace.

According to yet another aspect of the present invention, the motor may be provided wherein the motor controller is adapted to control a device for servicing one of a pool and a spa.

According to yet another aspect of the present invention, the motor may be provided wherein the motor controller is adapted to receive a second signal and to control the motor at least partially based on the second signal.

According to yet another aspect of the present invention, the motor may be provided wherein the motor controller is adapted to control the motor to optimize electrical consumption of the motor and electrical consumption of the climate control device.

According to yet another aspect of the present invention, the motor may further include a timer or a clock. The clock or timer is adapted to coordinate with the controller to control the pump motor to optimize electrical consumption costs.

According to yet another embodiment of the present invention, a method for managing the energy usage of one of a pool and a spa is provided. The method includes the steps of providing a pump motor, providing a controller for the pump motor, sending to the controller a signal from an energy load corresponding to the energy usage of the energy load, and actuating the pump motor at least partially in response to the signal.

According to yet another aspect of the present invention, the method may further include the steps of receiving a second signal with the controller and actuating the pump motor at least partially in response to the second signal.

According to yet another aspect of the present invention, the method may further include the step of controlling the motor to optimize electrical consumption of the motor and electrical consumption of the climate control device.

According to yet another aspect of the present invention, the method may further include the steps of providing a timer or a clock and actuating the pump motor at least partially in response to the timer and/or the clock to optimize electrical consumption costs.

DETAILED DESCRIPTION OF THE INVENTION

Figure 1:
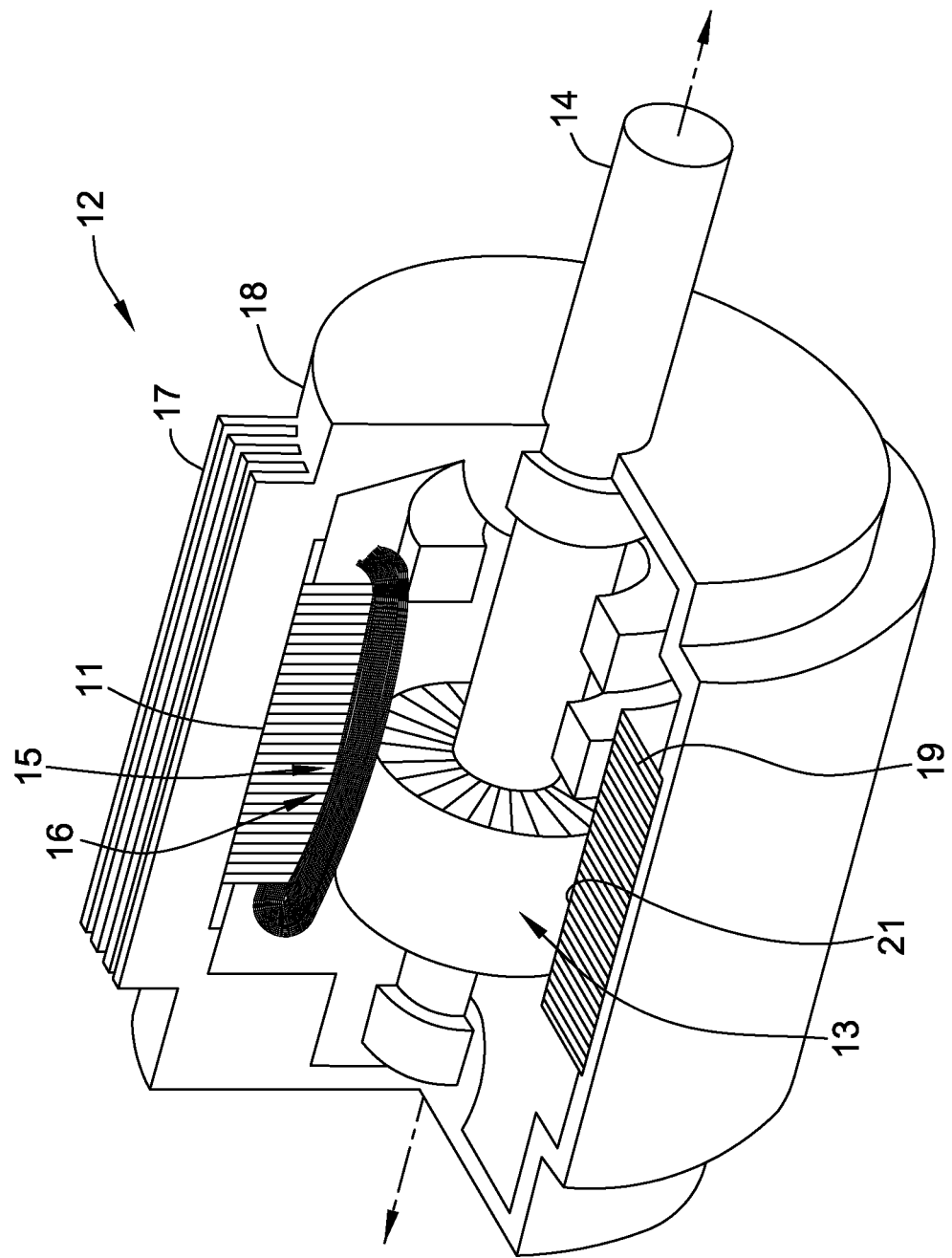
FIG. 1 is a perspective view of an electric motor for use with the system of the present invention.

Pools and spas are typically equipped with pumps to circulate water within the pools and spas to maintain a pleasant condition for the water in the pool. Pumps and pump motors are designed to be able to circulate the water within the pool or spa sufficiently while operating for only a portion of the time.

Energy consumption from energy providers tends to vary during different days of the week and at different times of the day. Energy provided by the energy providers must be capable of meeting the demands of the consumer at all times, particularly at times of highest energy consumption. Due to the enormous capital expenses required to construct and maintain the infrastructure necessary to provide electrical power to residential consumers, energy providers have devised methodologies to discourage energy use at those times of highest energy consumption.

These methodologies are based in part on demand response (hereinafter "DR"). DR is defined as changes in electric usage by end-use customers from their normal consumption patterns in response to changes in the price of electricity over time, or to provide a billing structure designed to induce lower electricity use at times of high wholesale market prices or when system reliability is jeopardized. The methodologies include higher per kilowatt hour rates at peak times or higher per kilowatt hour rates when the home energy demand exceeds a threshold point (also known as demand response pricing), prohibitions for certain utility use at certain times, and utility control of consumer loads.

Pool and spa pump motors are typically electric motors. The pool and spa pump motors are one device type for which energy consumption can be timed for use at times of lower energy consumption. Timing such consumption can be difficult or inconvenient, particularly where the methodologies are complex.

Technical effects of the methods, systems, and apparatus described herein include at least one of reduced cost, improved serviceability, improved performance and quality, and reduced labor costs.

The electric pool and spa pump motors typically include housing for containing and supporting a stator which is excited by an electrical source that induces an electromagnetic field in coils in the stator. The coils interact with a rotor rotatably supported in the housing to provide the mechanical rotational energy for the electrical machine.

Many modern electric motors include a control, for controlling the motor. The control may control the speed and direction of the motor by, for example, controlling the electrical energy going to the coils. The control typically includes a plurality of electrical components.

The electric machine typically includes housing for containing and supporting the stator. While the electrical components may be positioned in a separate control, spaced from the housing of the electric machine, typically, to reduce cost, to reduce space requirements or for other reasons, at least a portion of the electrical components are positioned within the electric machine housing.

Typically, to permit heat generated by the coils and by electrical components to exit the housing, the housing is vented. In many applications a fan may be positioned within the housing to provide for additional air flow to cool the electric machine components.

According to an embodiment of the present invention and referring to FIG. 1, an electric machine 12 is provided. The electric machine 12 may be an electric motor or an electric generator, but hereinafter will be described as an electric motor 12. It should be appreciated that the electric motor may be used to power any mechanism, for example, a pool or spa pump.

The electric motor 12 typically includes a centrally located motor shaft 14 that rotates relative to the motor 12. Electrical energy applied to coils 15 within the motor 12. The coils generate an electromagnetic field that cooperates with an electromagnetic field in rotor 13 mounted to the motor shaft 14. The coils 15 initiate relative motion between the shaft 14 and the motor 12 that transfers the power from the coils to the shaft 14.

A stationary assembly 16, also referred to as a stator, includes stator core 11 and coils 15 or windings positioned around portions of the stator core 11. It is these coils to which energy is applied to initiate this relative motion which transfers the power to the shaft. These coils 15 are formed by winding wire (not shown), typically copper, aluminum or a combination thereof, about a central core to form the winding or coil. An electric current is directed through the coils 15 which induce a magnetic field. It is the magnetic field that initiates this relative motion which transfers the power to the shaft 14. The stator core 11 typically includes a plurality of stator core laminations 19 that define stator teeth 21 around which the coils 15 are wound.

Typically the motor 12 includes a housing 17 having an inner wall or surface that defines a motor cavity therein. The housing 17 may include a plurality of components and may be made of a suitable durable material, for example a metal, a polymer or a composite. The housing 17 may, as shown, include a cylindrical shell 18 and opposed end caps (not shown).

It should be appreciated that the housing of the motor may have any suitable shape. One common shape of a motor housing is that of a cylindrical solid, having a generally cylindrical cross section. The shaft on a motor with such a shape generally extends from an end of the motor.

The motor 12 may have any suitable size and shape and may be, for example, an induction motor, a permanent-split capacitor (PSC) motor, an electronically commutated motor (ECM) motor, or a switched reluctance motor. The housing 17 may include protrusions, for example fins (not shown), for dissipation of heat. The motor 12 may also include a fan (not shown) positioned within housing 17. ECM motors utilize electronics, including logic circuits to time commutation of the motor to obtain variable desired speeds for the motor.

Figure 2:
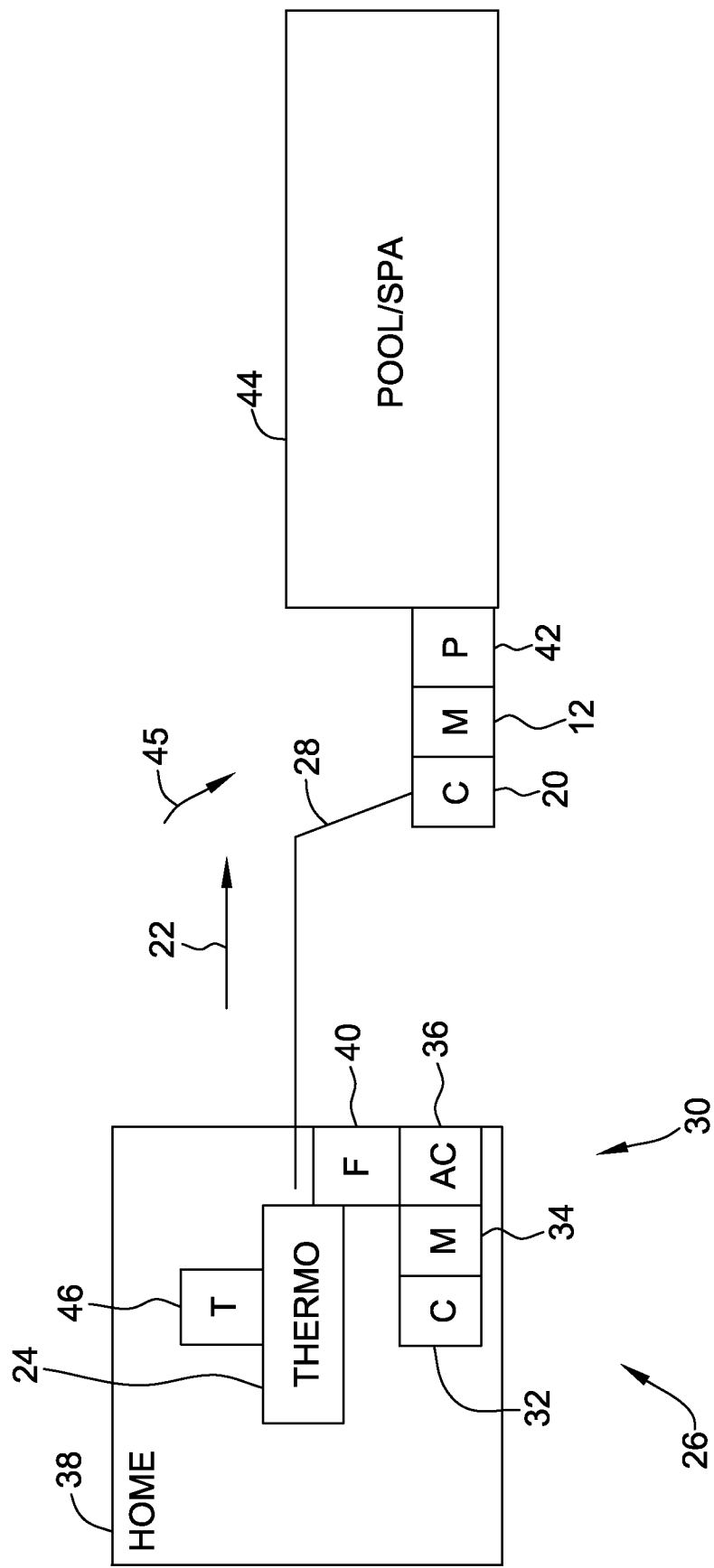
FIG. 2 is a schematic view of an embodiment of the present invention in the form of system including a motor controller and a motor.

Referring now to FIG. 2 and according to an embodiment of the invention, a pump motor controller 20 for managing energy usage of pump motor 12 and for receiving signals 22 from a signal sending device 24 corresponding to the status of a climate control device 26 is provided. The pump motor controller 20 is adapted to receive the signals 22 and to control the pump motor 12 at least partially based on the signals 22.

The pump motor controller 20 may be any suitable controller capable of controlling the motor and capable of receiving signals to so control the motor. The controller 20 may include a circuit board or boards (not shown) that are adapted to received electronic components (not shown), in the form of, for example, discrete components, integrated circuits or some combination thereof.

The signals 22 may be any signals and may be electrical signals. The signals may be sent by wire 28 or wirelessly (not shown).

According to an aspect of the present invention, the pump motor controller 20 may be provided wherein the signal sending device 24 is a home climate thermostat. For example and as shown in FIG. 2, the home climate thermostat 24 may be used to control a climate control device 26 in the form of a home climate system 30 including a home climate controller 32, a climate system motor 34 and an air conditioner 36 for a home 38. The home climate system 30 may also include a furnace 40 and a humidifier (not shown).

The climate system motor 34 may be a forced air furnace blower motor. Additional motors (not shown) may be a part of the home climate system 30. For example, the system 30 may include a draft inducer motor (not shown), an air conditioning compressor motor (not shown), and/or an air conditioning evaporator cooling motor (not shown), According to another aspect of the present invention, the pump motor controller 20 may be provided wherein the motor 12 includes an electronically commutated motor. The motor 12 may be connected to a pool pump 42 for circulating water in a pool 44. According to yet another aspect of the present invention, the pump motor controller 20 may be provided wherein the pump motor controller 20 is adapted to control a device in the form of motor 12 for servicing of a pool and/or spa 44.

According to yet another aspect of the present invention, the pump motor controller 20 may be provided wherein the pump motor controller 20 is adapted to receive a second signal 45 and to control the pump motor 12 at least partially based on the second signal 45.

The second signal 45 may be one of the signals 22 from the thermostat 24 or may be a signal from another device (not shown), for example from an energy provider or from a pool or pool pump controller (not shown) or from a user interface (not shown) for a home climate system, pool system, pool pump or a pool pump motor.

According to yet another aspect of the present invention, the pump motor controller 20 may be provided wherein the controller 20 is adapted to control the pump motor 12 to optimize electrical consumption of the pump motor 12 and electrical consumption of the climate control device 26.

The optimization of electrical consumption may be obtained by minimizing electrical utility costs to the homeowner. Such costs may be minimized by utilizing the electricity and thereby incurring the utility costs at a time when the utility rates are lower. While operating the climate control device 26 only when the utility rates are lower may save utility costs, the device 26 may then no longer be able to provide comfortable conditions to the home 38. However, operating the pool pump motor 12 only when the utility rates are lower will save utility costs, while still providing the pool 44 with clean, comfortable water. Typically pool pumps 42 are designed to provide sufficient water flow such that circulating water with the pool pump motor 12 only when utility rates are lower should provide a pool with clean, comfortable water.

The optimization of electrical consumption may also be obtained by leveling the electrical use by the homeowner during the day. In doing so the climate control device 26 (air conditioner) of the home may operating the greatest during the heat of the day and the pool pump motor 12 may be shut off then and turned on at night when the climate control device 26 (air conditioner) may not be operating. Do so is called load leveling the home and is a way of optimization of electrical consumption.

Regardless of whether the pool pump motor 12 is scheduled to simply operate at when the climate control device 26 is not operating, whether the pool pump motor 12 is scheduled to operate to provide level loading, or whether the whether the pool pump motor 12 is scheduled to operate to minimize electrical cost, such scheduling may be performed by a the pump motor controller 20 or a similar controller such as a pool system controller. The scheduling may be accomplished by providing code for the controller. The scheduling may be based on formulas and or by tables which provide pump operating instructions based on inputs to the controller.

According to yet another aspect of the present invention, the pump motor controller 20 may be provided wherein the system 26 further includes a timing device 46, for example in the form of a timer or a clock. The timing device 46 is adapted to coordinate with the pump motor controller 20 to control the pump motor 12 to optimize electrical consumption costs. This may be accomplished, for example, by timing the pump motor 12 to only operate at times when the utility rates are lower.

Figure 3:
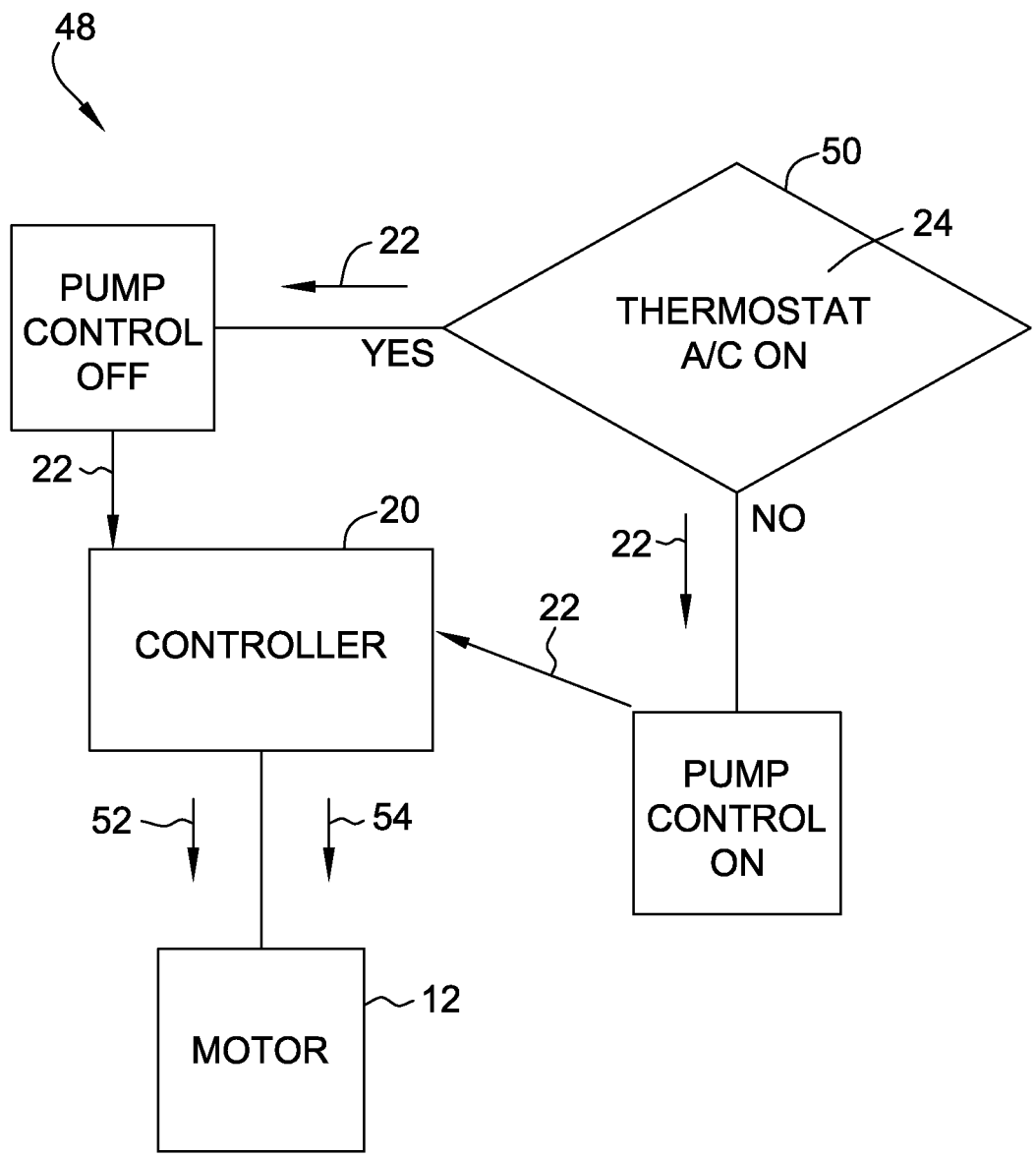
FIG. 3 is a flow diagram of another embodiment of the present invention in the form of system including a motor controller and a thermostat.

Referring now to FIG. 3, flow chart 48 is shown. Flow chart 48 shows how the thermostat 24 is used to control the pool pump motor 12. The flow chart 48 includes a first decision block 50 where an inquiry is made as to whether the thermostat 24 has the climate control device 26 (air conditioner 36, for example) off or on. If the climate control device 26 (air conditioner 36, for example) is not on, signal 22 indicating that the climate control device 26 (air conditioner 36, for example) is not on is sent to controller 20. The controller 20 then sends a signal 52 to motor 12 to turn on the motor 12. Conversely, if the climate control device 26 (air conditioner 36, for example) is on, signal 22 indicating air conditioner 36 is on is sent to controller 20. The controller 20 then sends a signal 54 to motor 12 to turn off the motor 12.

Figure 4:
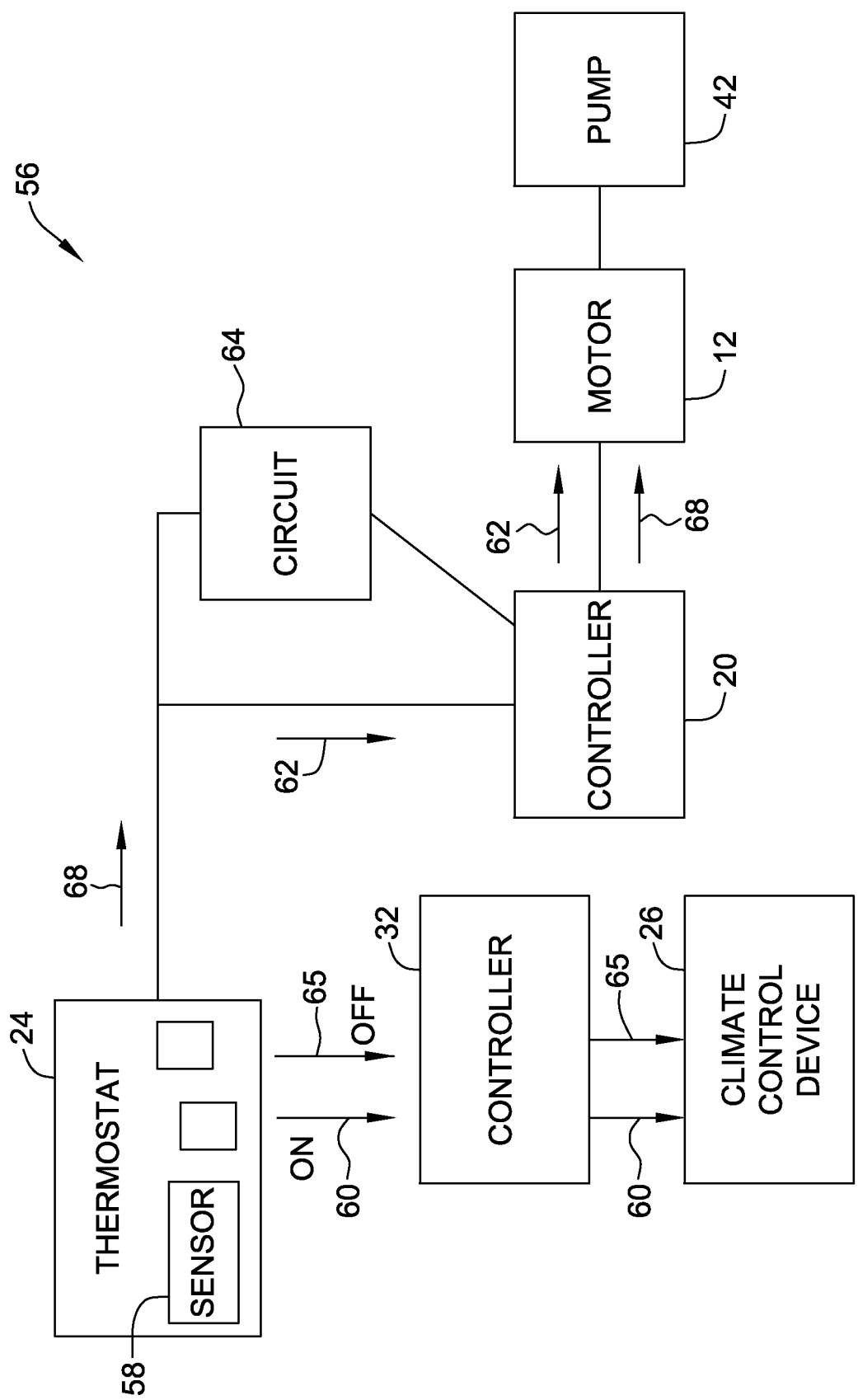
FIG. 4 is a flow diagram of another embodiment of the present invention in the form of system including a motor controller and a motor.

Referring now to FIG. 4, flow chart 56 is shown. Flow chart 56 shows how the thermostat 24 is used to control the pool pump motor 12 and the climate control device 26. The thermostat 24 includes a temperature sensor 58. When in air conditioning mode, when the temperature sensor 58 senses a temperature above an minimum on setting, the thermostat 24 sends a signal 60 to the home climate controller 32 to turn on the climate control device (air conditioning unit) 26. The thermostat 24 then send a signal 62 to the pool pump motor controller 20 to turn off the pool pump motor 12. Alternatively and as shown in FIG. 4, the signal 62 may be sent to ramp down circuit 64 within the pool pump motor controller 20 to ramp down the speed of the pool pump motor 12, rather than abruptly shutting off the pool pump motor 12.

When in air conditioning mode, when the temperature sensor 58 senses a temperature below a maximum off setting, the thermostat 24 sends a signal 65 to the home climate controller 32 to turn off the climate control device (air conditioning unit) 26. The thermostat 24 then send a signal 68 to the pool pump motor controller 20 to turn on the pool pump motor 12.

Figure 5:
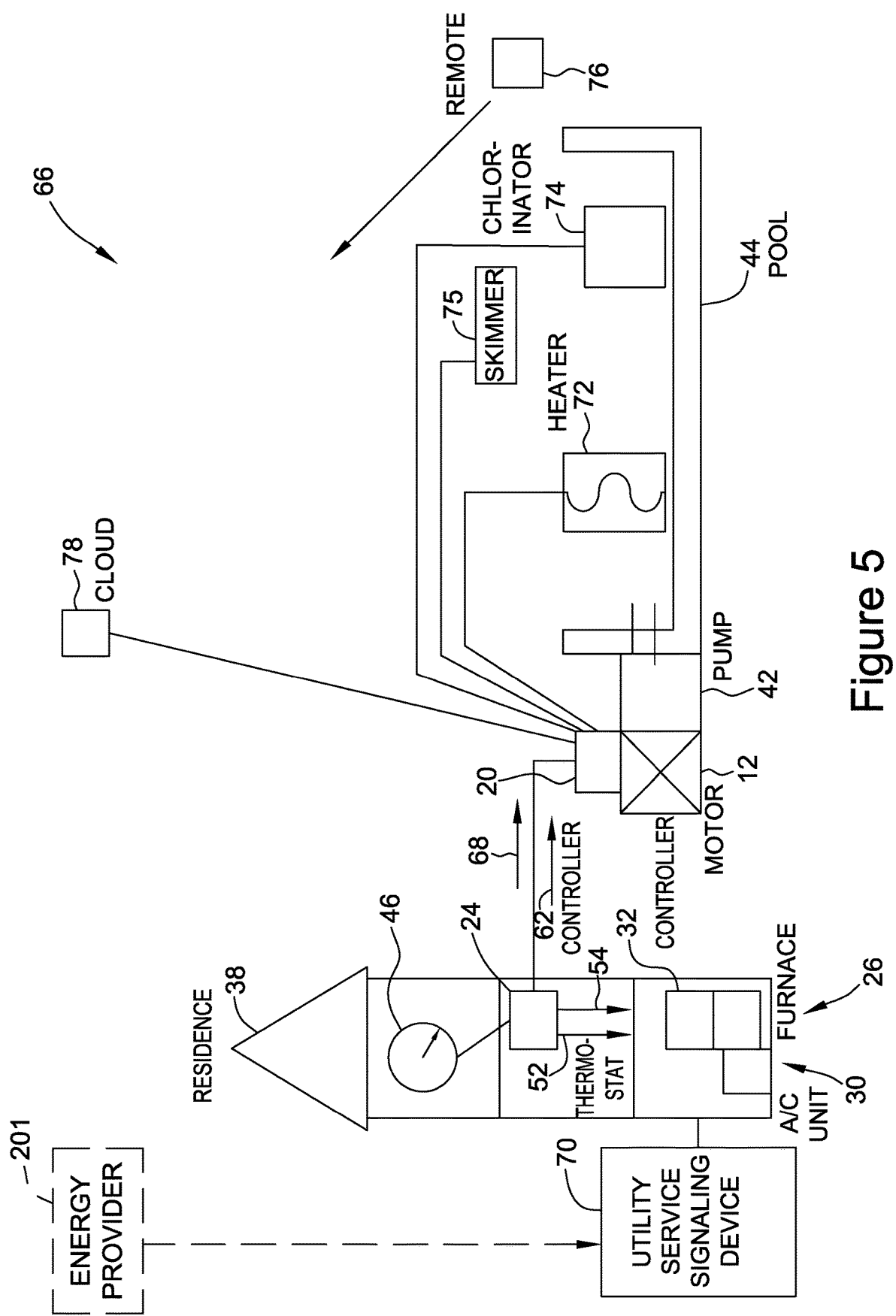
FIG. 5 is a schematic diagram of another embodiment of the present invention in the form of system including a pump, motor and motor controller.

Referring now to FIG. 5, home power control system 66 is shown. The system 66 includes home 38 having a climate control device 26 controlled by home climate controller 32 receiving signals 52 and 54 from thermostat 24. A timer 46 is also connected to at least one of thermostat 24 and controller 32. A utility service signaling device 70, which communicates with an energy provider 201, is also connected to at least one of thermostat 24 and controller 32.

The system 66 also includes pool/spa 44 having a pool pump 42 powered by pool pump motor 12 controlled by controller 20 receiving signals 62 and 68 from thermostat 24. Peripheral devices, including for example heater 72, chlorinator 74 and skimmer 75 may also be connected to controller 20. Alternatively, the system 66 may include a pool controller (not shown) to which the pool pump motor 12, heater 72, chlorinator 74 and skimmer 75 may be connected. The thermostat 24, climate control device 26, pool pump motor 12, heater 72, chlorinator 74 and skimmer 75 may be connected wirelessly to a remote device 76. The remote device 76 may be used to control the thermostat 24, climate control device 26, pool pump motor 12, heater 72, chlorinator 74 and skimmer 75.

The controllers 20 and 32 may also be connected to the remote device 76. The remote device 76 may use any available technology and may be connected to cloud 78 in any suitable manner. For example, the cloud connection may be in the form of a wireless network supplied by a router (not shown), by a wireless cellular provider, or through Bluetooth® (a trademark of Bluetooth SIG, Inc.) technology.

The pool pump motor 12 may be energized to operate when the climate control device 26 is not energized. The signal to energize the pool pump motor 12 may come from the pool pump controller 20, from the timer 46, from the thermostat 24, from the home climate controller 32 or from utility service signaling device 70.

Figure 6:
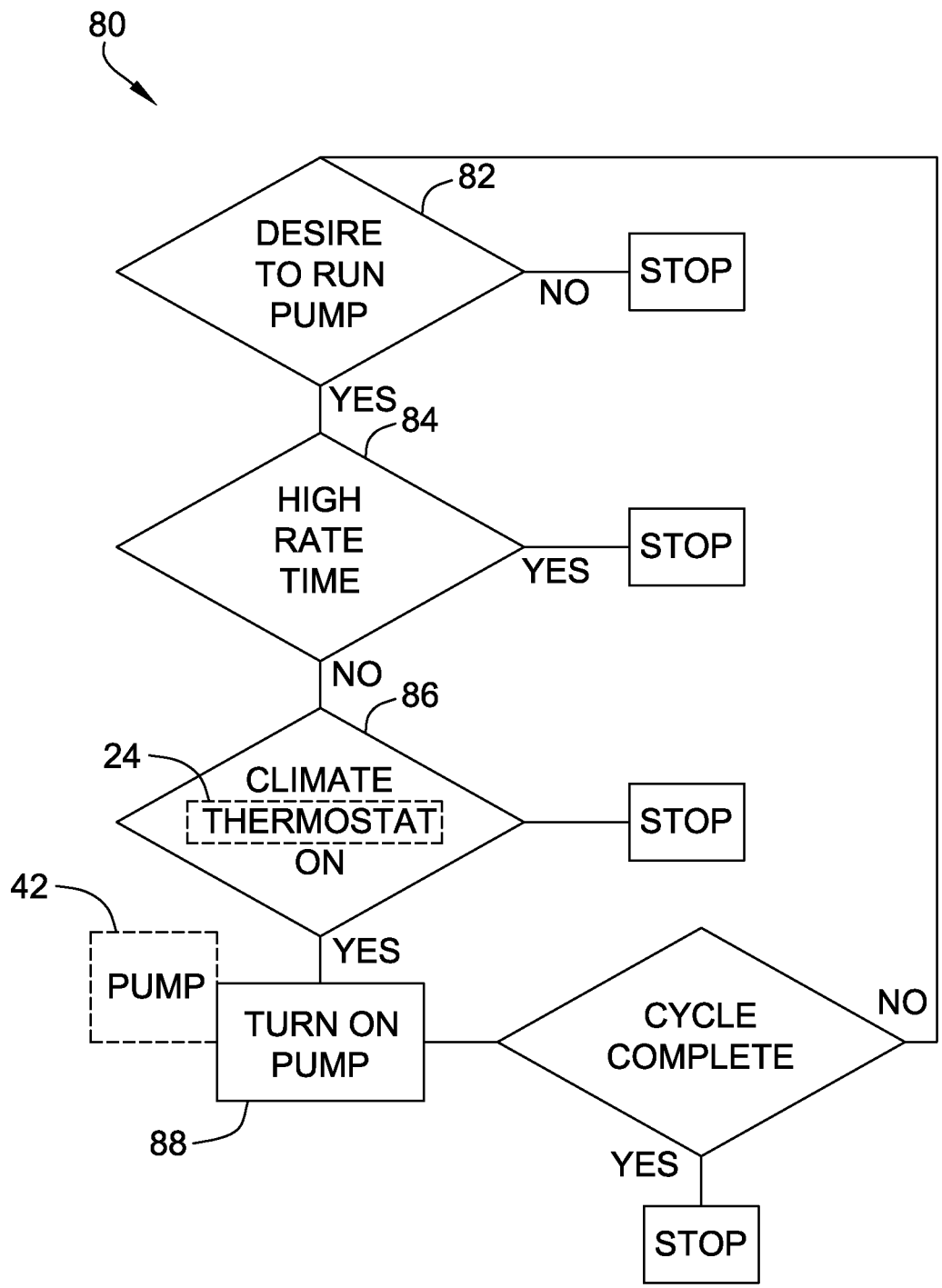
FIG. 6 is a flow diagram of the system of FIG. 5.

Referring now to FIG. 6, flow chart 80 is shown. Flow chart 80 shows how a home climate thermostat 24 may control a pump motor 12. (see FIG. 5). In first decision block 82 of flow chart 80 a determination related to a desire to run pump is made. If the determination is yes, the flow chart 80 logic advances to second decision block 84 where a determination related to whether it is a high utility rate time is made. If the determination is yes, the flow chart 80 logic advances to third decision block 86 where a determination related to whether the climate control thermostat is on. If the determination is no, the flow chart 80 advances you to action block 88 where the pump is turned on.

Figure 7:
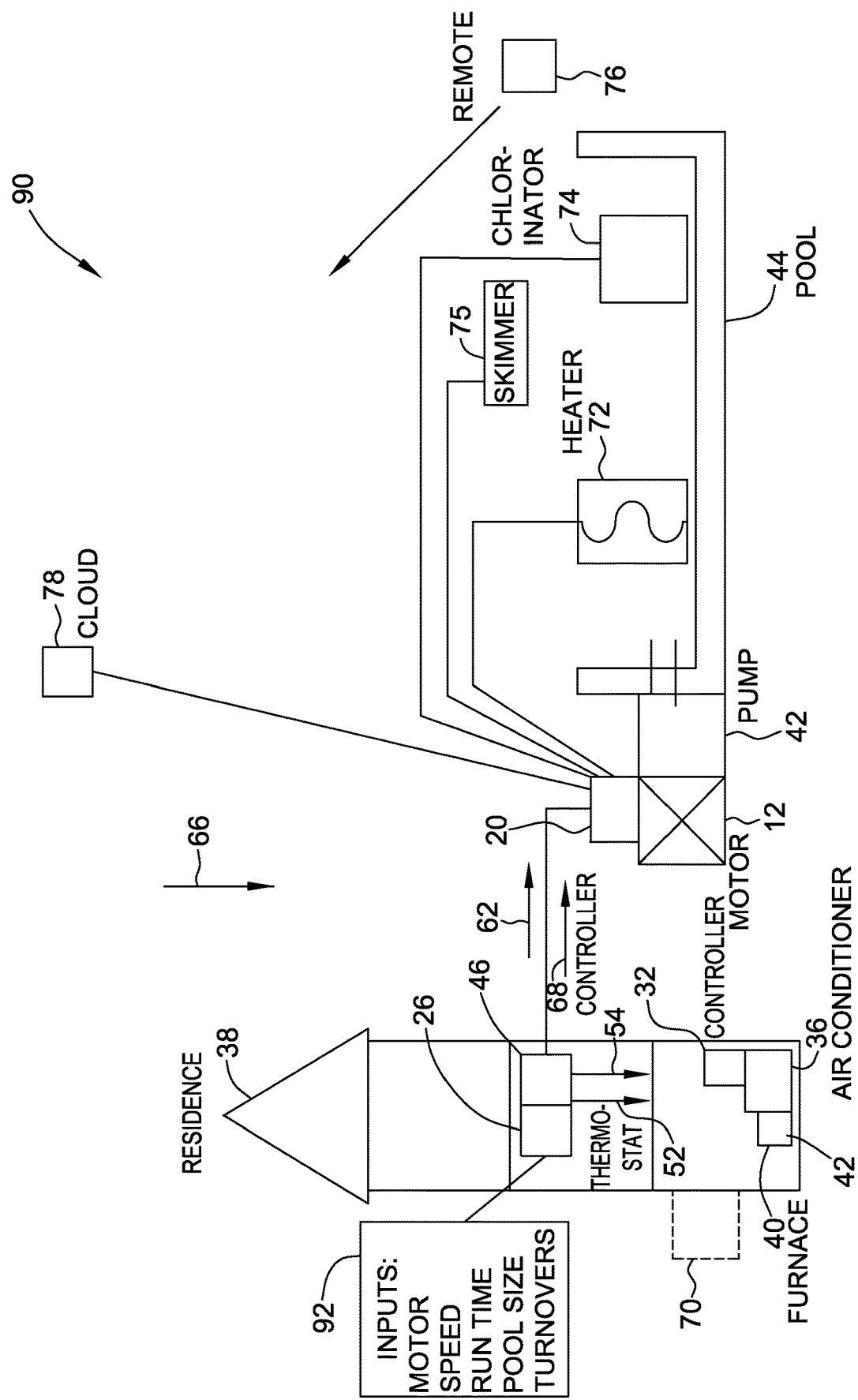
FIG. 7 is a schematic diagram of another embodiment of the present invention in the form of system including a pump, motor, motor controller, and other peripheral equipment.

Referring now to FIG. 7, home power control system 90 is shown. The system 90 includes home 38 having a climate control device 26 controlled by home climate controller 32 receiving signals 52 and 54 from thermostat 24. A timer 46 is also connected to at least one of thermostat 24 and controller 32. Inputs 92 may be stored in thermostat 24, in home climate controller 32 and/or in motor controller 20.

Inputs 92 may include utility rate schedules, home climate system status, pump motor speed, pump run time, pool size and pool water turnovers. A turnover occurs when all the water in a pool passes through the pool pump which is equivalent to the time required for the pool pump to pump enough water to fill the pool. It may be expressed in number of turnovers per day or in a similar unit. The inputs 92 may be utilized in a controller algorithm to provide for proper operation of the pool pump motor to provide for clean pleasant water in the pool and to minimize utility costs.

The system 90 also includes pool/spa 44 having a pool pump 42 powered by pool pump motor 12 controlled by controller 20 receiving signals 62 and 68 from thermostat 24. Peripheral devices, including for example heater 72, chlorinator 74 and skimmer 75 may also be connected to controller 20. Alternatively, the system 66 may include a pool controller (not shown) to which the pool pump motor 12, heater 72, chlorinator 74 and skimmer 75 may be connected. The thermostat 24, climate control device 26, pool pump motor 12, heater 72, chlorinator 74 and skimmer 75 may be connected wirelessly to a remote device 76. The remote device 76 may be used to control the thermostat 24, climate control device 26, pool pump motor 12, heater 72, chlorinator 74 and skimmer 75. The controllers 20 and 32 may also be connected to the remote device 76. The remote device 76 may use any available technology and may be connected to cloud 78 in any form, For example, the cloud connection may be in the form of a wireless network supplied by a router (not shown), by a wireless cellular provider, or through Bluetooth® (a trademark of Bluetooth SIG, Inc.) technology.

The pool pump motor 12 may be energized to operate when the climate control device 26 is not energized. The signal to energize the pool pump motor 12 may come from the pool pump controller 20, from the timer 46, from the thermostat 24, from the home climate controller 32 or from utility service signaling device 70.

Figure 8:
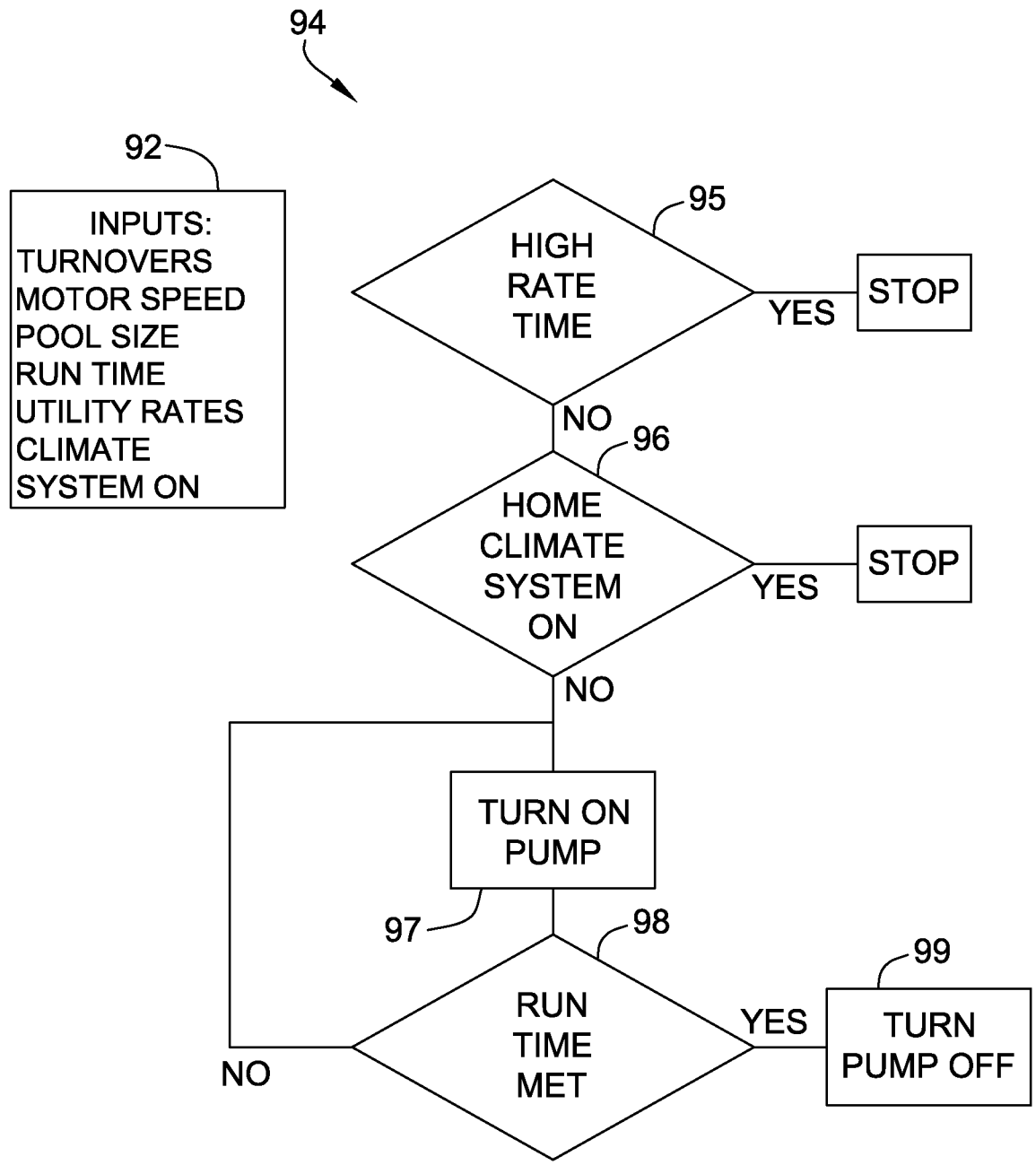
FIG. 8 is a flow diagram of the system of FIG. 7.
Figure 9:
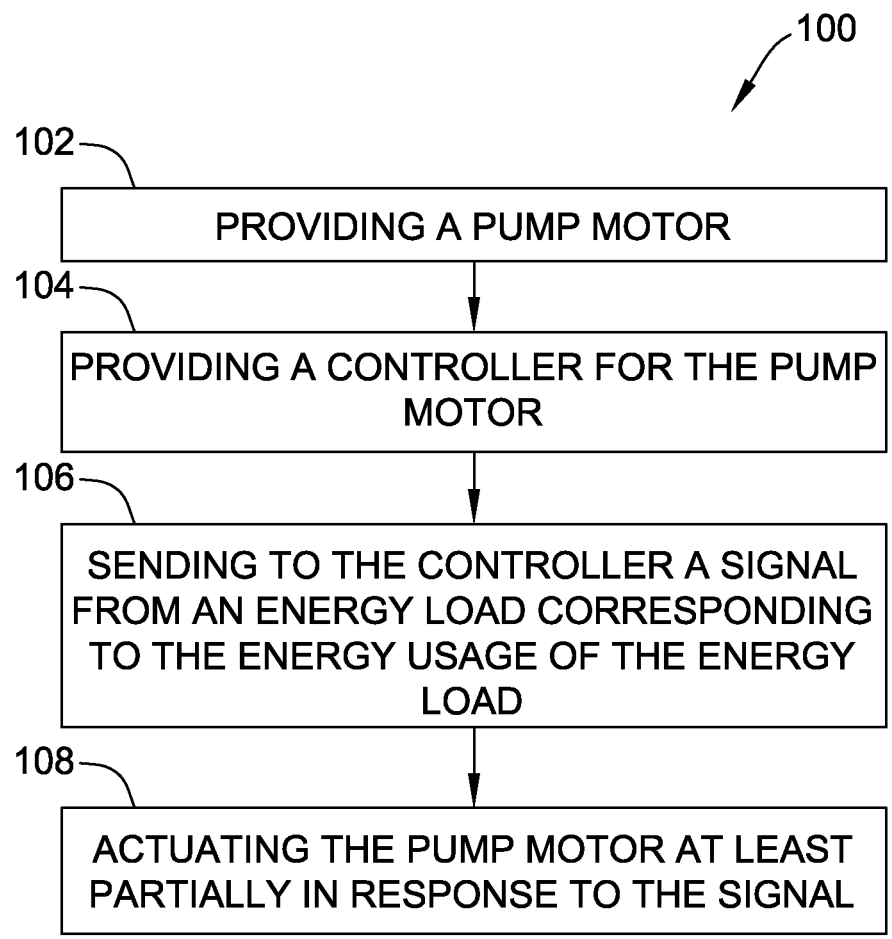
FIG. 9 is a flow chart of another embodiment of the present invention in the form of a method for providing a motor controller and a motor.

Referring now to FIG. 8, flow chart 94 is shown. Flow chart 94 shows how a home climate thermostat 24 may control a pump motor 12. (see FIG. 7). In first decision block 95 of flow chart 94 a determination as to whether the current utility rate is high is made. If the determination is no, the flow chart 94 logic advances to second decision block 96 where a determination as to whether the home climate system is on is made. If the determination is no, the flow chart 94 logic advances to first action block 97 where the pump is turned on. Next, in third decision block 98 of flow chart 94 a determination as to whether the run time of the pump has been met is made. If the determination is no, the flow chart 94 returns to action block 97 to keep the pump motor 12 on. If the determination is yes, the flow chart 94 logic advances to second action block 99 where the pump is turned off.

According to yet another embodiment of the present invention, a method 100 for managing the energy usage of one of a pool and a spa is provided. The method 100 includes step 102 of providing a pump motor, step 104 of providing a controller for the pump motor, step 106 of sending to the controller a signal from an energy load corresponding to the energy usage of the energy load, and step 108 of actuating the pump motor at least partially in response to the signal.

According to yet another aspect of the present invention, the method may further include the steps of receiving a second signal with the controller and actuating the pump motor at least partially in response to the second signal.

According to yet another aspect of the present invention, the method may further include the step of controlling the motor to optimize electrical consumption of the motor and electrical consumption of the climate control device.

According to yet another aspect of the present invention, the method may further include the steps of providing a timer or a clock and actuating the pump motor at least partially in response to the one of the timer and the clock to optimize electrical consumption costs.

The methods, systems, and apparatus described herein facilitate efficient and economical assembly of an electric machine. Exemplary embodiments of methods, systems, and apparatus are described and/or illustrated herein in detail. The methods, systems, and apparatus are not limited to the specific embodiments described herein, but rather, components of each apparatus and system, as well as steps of each method, may be utilized independently and separately from other components and steps described herein. Each component, and each method step, may also be used in combination with other components and/or method steps.

When introducing elements/components/etc. of the methods and apparatus described and/or illustrated herein, the articles "a", "an", "the", and "the" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Described herein are exemplary methods, systems and apparatus utilizing lower cost materials in a permanent magnet machine that reduces or eliminates the efficiency loss caused by the lower cost material. Furthermore, the exemplary methods system and apparatus achieve increased efficiency while reducing or eliminating an increase of the length of the machine. The methods, system and apparatus described herein may be used in any suitable application. However, they are particularly suited for HVAC and pump applications.

Exemplary embodiments of the fluid flow device and system are described above in detail. The electric machine and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A power control system for managing energy usage of a pump motor and a climate system motor, said power control system comprising:
    a home climate controller configured to receive a signal from a home climate thermostat for operating the climate system motor during warm periods of a day; and
    a pump motor controller configured to receive a signal from an energy provider, via a utility service signaling device, indicating a utility rate and further configured to operate the pump motor only when the utility rate is lower than a peak time utility rate and the climate system motor is not operating.

2. The power control system according to claim 1, wherein the pump motor comprises an electronically commutated motor.

3. The power control system according to claim 1, wherein said pump motor is for use with a pool.

4. The power control system according to claim 1, wherein said pump motor is for use with a spa.

5. A system for managing energy usage in at least one of a pool or a spa, and in a home climate system, said system comprising:
    a utility service signaling device configured to receive a signal from an energy provider indicating when a utility rate is a high utility rate;
    a pump motor for powering a pump for use in the at least one of a pool or a spa;
    a climate system motor for operating the home climate system having a climate thermostat coupled thereto for controlling operation of said climate system motor; and
    a pump motor controller for controlling the pump motor, said pump motor controller including logic configured to:
    receive a signal from the climate thermostat indicating the pump motor should run;
    determine, based on the signal from the energy provider, the utility rate is not a high utility rate; and
    run the pump motor only when the climate thermostat is not operating said climate system motor and in response to receiving the signal and determining the utility rate is not a high utility rate.

6. The system according to claim 5, wherein the pump motor comprises an electronically commutated motor.

7. The system according to claim 5, wherein said pump motor is for use with a pool.

8. The system according to claim 5, wherein said pump motor is for use with a spa.

9. The system according to claim 5, further comprising a heater for heating the at least one of a pool or a spa.

10. The system according to claim 5, further comprising a chlorinator for use with the at least one of a pool or a spa.

11. The system according to claim 5, further comprising a skimmer for use with the at least one of a pool or a spa.

12. The system according to claim 5, further comprising a remote for use with said system.

13. The system according to claim 5, wherein said home climate system comprises a furnace.

14. The system according to claim 5, wherein said home climate system comprises an air conditioning unit.

15. A method for managing energy usage of a pool or a spa, said method comprising:

providing a pump motor;

providing a pump motor controller for the pump motor;

receiving, at a utility service signaling device, a selected one of a first demand response signal from an energy provider indicating a high utility rate time and a second demand response signal from the energy provider indicating not a high utility rate time;

sending, to the pump motor controller, the selected one of the first demand response signal and the second demand response signal indicating either a high utility rate time or not at a high utility rate time;

receiving a signal from a climate thermostat indicating whether a home climate system is operating; and energizing the pump motor at least partially in response to the signal received from the energy provider and only in response to the signal from the climate thermostat indicating the home climate system is not operating.

16. The method as in claim 15, wherein energizing the pump motor comprises energizing the pump motor only when the signal from the energy provider does not indicate a high utility rate time.

17. The method as in claim 15 further comprising:

providing a climate system motor; and controlling the climate system motor at least partially with the pump motor controller.

* * * * *